May 6, 1958     T. H. MARSHALL     2,833,398
INFLATED-CUSHION SEALED CONTAINER
Filed April 13, 1955
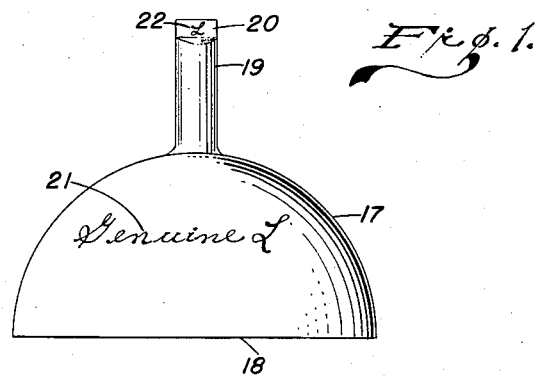
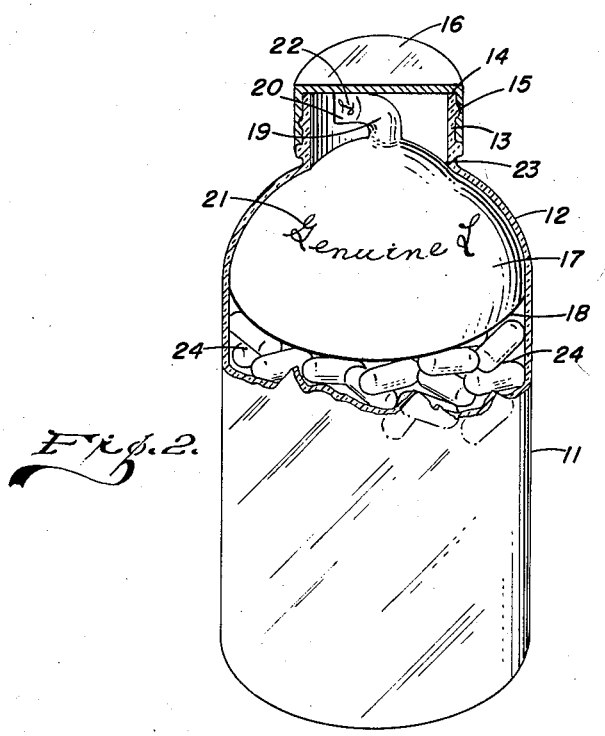
INVENTOR.
THEODORE HENRY MARSHALL
BY
ATTORNEY

United States Patent Office 2,833,398
Patented May 6, 1958

2,833,398

INFLATED-CUSHION SEALED CONTAINER

Theodore Henry Marshall, Pearl River, N. Y., assignor to American Cyanamid Company, New York, N. Y., a corporation of Maine Application April 13, 1955, Serial No. 501,124

2 Claims. (Cl. 206—46)

This invention relates to a sealed container for fragile articles.

Particularly in the pharmaceutical field a need has been felt for a container for packaging fragile articles under restraint so that articles are not damaged during shipment and are maintained in a clean condition without breakage until ready for use.

Inflated bags have been used for restraining articles such as cigars, as shown by Patent 607,826 to Burger et al., Cigar-Moistener and Pressure Device. Spring loaded retainers have been used for packaging capsules as shown by Patent 1,138,562, Herboldt, Medicine-Box. However, these methods have only been partially successful.

It is an object of this invention to provide an article-restraining inflatable cushion which retains itself in position in a glass bottle.

It is another object to provide an inflated cushion which serves as an additional seal even if the cap on the bottle should inadvertently become loose or lost.

It is a further object of this invention to provide a tamper-proof closure.

It is an additional object to provide a moisture-resistant closure.

It is a still further object to provide a heat-sealable closure which may be readily opened and which is not easily reclosable, nor can it be counterfeited.

It is yet another object of this invention to provide a single closure which will allow for variation in the height of fill of the articles in a bottle and yet completey fill the bottle.

It is a further object of this invention to provide an economical method of sealing pharmaceutical containers.

Packaging of capsules, tablets and other pharmaceutical products has caused much trouble to manufacturers. Breakage, dusting, contamination, oxidation, and moisture leakage are common problems. Also with valuable pharmaceutical products there is a tendency for unscrupulous individuals to counterfeit or pass off substitute products by refilling genuine bottles with substitute products. Further, there has been difficulty in obtaining moisture-proof containers.

By this invention is provided a closure for the ordinary shouldered glass bottle by which articles are filled into the bottle to any desired level and the remaining portion up to the shoulder filled by an inflated pneumatic bag which completely fills the space above the articles and which rests on the shoulder. By using a low gas pressure a gentle yet firm restraint holds the articles in position so the articles cannot shift position with associated breakage or damage. The bag is sealed with a stem on the bag in the neck of the bottle. Preferably the bag is made of thermoplastic materials such as polyethylene, rubber hydrochloride, plasticized polyvinyl chloride, plasticized polyvinylidene chloride, copolymers of styrene and acrylonitrile, copolymers of acrylonitrile and butadiene, copolymers of styrene and butadiene or materials coated so as to be heat sealable. The bag is placed in position above the articles, inflated and sealed in the inflated state by a hot press. A rubber bag may be used with a clip or other type of closure. It is preferred that a heat-sealable material may be used so that once closed the bag cannot be reclosed after opening without showing evidence of tampering.

It is preferred to have authenticating indicia on the surface of the bag so that a substitute bag may not be conveniently used. Additionally, it is preferred to use a sealing press for closing and sealing the stem of the bag which imprints authenticating indicia in the seal. When so closed it becomes extremely difficult for unauthorized persons to reclose the bottle without leaving evidence of tampering.

The bag fits against the shoulder of the bottle internally and gives a comparatively tight seal so that the contents of the bottles are practically hermetically sealed from the air. A drop of non-volatile liquid such as a silicone oil which is inert towards both the material of the bag and the contents of the container and which is non-toxic will be drawn between the bag and the bottle and give a completely air-tight closure. A small drop of such a liquid causes the closure to become practically completely impermeable so that hygroscopic articles may be stored in a moist climate for a period of years.

The bottle with the inflated bag therein is preferably covered by some type of protective closure, which may be a screw or press fit cap which advantageously is replaceable after the bag has been punctured and removed from the bottle.

A particular embodiment of the invention is shown in the accompanying drawings:

Figure 1 shows an inflated pneumatic thermosealing plastic bag.

Figure 2 shows a sealed bottle closed with an inflated pneumatic bag.

The glass bottle 11 has a shoulder 12 and a neck 13. At the top of the neck is a rim 14 and on the outside of the neck may be screw threads 15 on which a protective cover 16 is threaded. This much is a conventional bottle and screw closure.

Above the articles 24 in the bottle is a pneumatic bag 17. The pneumatic bag may be of rubber hydrochloride. One side of the pneumatic bag preferably is flat 18. The bag may be formed from a cone-shaped portion or a partially rounded portion, and a flat disk by sealing the flat disk across the large diameter of the cone or partially rounded portion. From the main body of the bag extends a stem 19. After the bag is placed in position and inflated, the stem 19 is closed off and sealed. The seal 20 is formed by pressing the sides of the stem together with a hot iron which causes them to melt and seal. The bag itself has authenticating indicia 21 on its surface. Also the hot iron which is used to seal the bag is engraved so that authenticating indicia 22 appear in the seal on the stem, when the sealing iron is removed. The stem is of such length that it readily fits into the neck of the bottle when the protective cover 16 is placed thereon. A small portion of silicone oil forms a liquid seal 23 and is drawn by capillary action between the bottle and the pneumatic bag to form an impervious closure. The rate of moisture diffusion through the seal is too low to be conveniently measured.

Having thus described my invention, I claim:

1. A package comprising: a container for fragile articles comprising a glass bottle having an article receiving portion, an open neck portion thereon, said neck portion being of markedly less diameter than said article receiving portion, and a shoulder between the neck portion and the article receiving portion, a gas filled, inflated, expansible, pneumatic, thermosealing-plastic, sealed bag in contact with said shoulder, and retained against expulsion by said shoulder, a heat-sealed stem portion on said bag projecting into the bottle neck, and sealed therein, thus enclosing an article receiving space below said bag; fragile articles filling said space, and supporting said bag against said shoulder; and a protective closure over the neck of the bottle.

2. A package as set forth in claim 1 comprising: a small portion of a non-toxic non-volatile liquid drawn by capillary action between the glass bottle and the said bag.

References Cited in the file of this patent

UNITED STATES PATENTS

| | | |
|---|---|---|
| 246,472 | Dean | Aug. 30, 1881 |
| 607,826 | Burger et al. | July 26, 1898 |
| 1,452,039 | Gravell | Apr. 17, 1923 |
| 1,744,719 | Berry et al. | Jan. 28, 1930 |
| 2,091,212 | McNeil | Aug. 24, 1937 |
| 2,222,042 | Nitardy | Nov. 19, 1940 |
| 2,586,775 | Benner et al. | Feb. 26, 1952 |
| 2,648,463 | Scherer | Aug. 11, 1953 |